INVENTOR.
WALTER F. COUSINO
BY
H. A. Schaich
ATTORNEY

United States Patent Office 3,621,759
Patented Nov. 23, 1971

3,621,759
FLUID PRESSURE ENGINE AND VALVING
SYSTEM THEREFOR
Walter F. Cousino, Toledo, Ohio, assignor to
Thermad, Inc.
Filed Feb. 6, 1970, Ser. No. 9,233
Int. Cl. F01b 1/06, 13/06, 15/02
U.S. Cl. 91—481                        7 Claims

ABSTRACT OF THE DISCLOSURE

The invention relates to a valving system for fluid pressure engines, such as steam engines, featuring the utilization of spring pressed check valves, such as a ball, for controlling the supply of pressured fluid to the engine, each such valve being periodically actuated to an open position by a momentarily applied impact force. The invention also provides an inexpensive construction for a relatively small fluid pressure engine, permitting the utilization of such engines in applications such as domestic lawn mowers, small garden tractors, or marine engines.

This invention relates to an improved valving system for fluid pressure engines, such as steam engines, and to an economical construction of such engines employing such valving systems.

The consistent supply of pressured fluid to fluid pressure operated engines, such as steam engines, has long been a problem in this art, as recognized by literally hundreds of patents directed to various valving and control arrangements. Not only must the valving arrangement provide consistent rapid response, but it must also be capable of convenient adjustment to provide a controlled variation in the amount of fluid admitted to the expansion chamber of the fluid pressure engine during each cycle. Additionally, the valve construction must be such as to eliminate any erosion of the valving surfaces due to the deteriorating action of high velocity fluid flowing past such valving surfaces. Above all, the valving arrangement, if it is to be successfully applied to consumer-operated devices such as lawn mowers, must be susceptible to control by a simple manual movement of a control knob or dial and, as is true in any other consumer-operated device where unskilled operators are involved, the valving arrangement must incorporate automatic speed-governing features so that irrespective of what setting of the valve the engine may be started by the inexperienced operator, the final engine speed will not be so high as to involve the possibility of damage to the engine.

In addition to all of the aforestated requirements of a valving system for a fluid pressure engine, if such engines are to be applied to consumer power applications, such as lawn mowers, garden tractors, and marine engines, it is essential that the entire construction of the engine be so economical as to permit the engine to be manufactured at the very low cost level currently achieved by internal combustion engines of the ten horsepower or less class.

Accordingly, it is an object of this invention to provide an improved valving system for a fluid pressure engine, such as a steam engine.

A particular object of this invention is to provide an improved valving system for a radial type multi-cylinder steam engine, wherein the inlet valve for each cylinder comprises a spring-pressed ball check valve which is momentarily displaced from its normally closed position by an impact derived from a cam roller carried by a rotary flywheel of the engine.

A further object of this invention is to provide an improved design of steam engine permitting the fabrication of such engine by assembly of relatively simple components, each of which may be produced by simple machining operations on plates or rods, eliminating the need for expensive and time-consuming machining operations on complex castings.

Other objects and advantages of this invention will become apparent from the following detailed description taken in conjunction with the annexed sheets of drawings, on which are shown a preferred embodiment of the invention.

Figure 1:
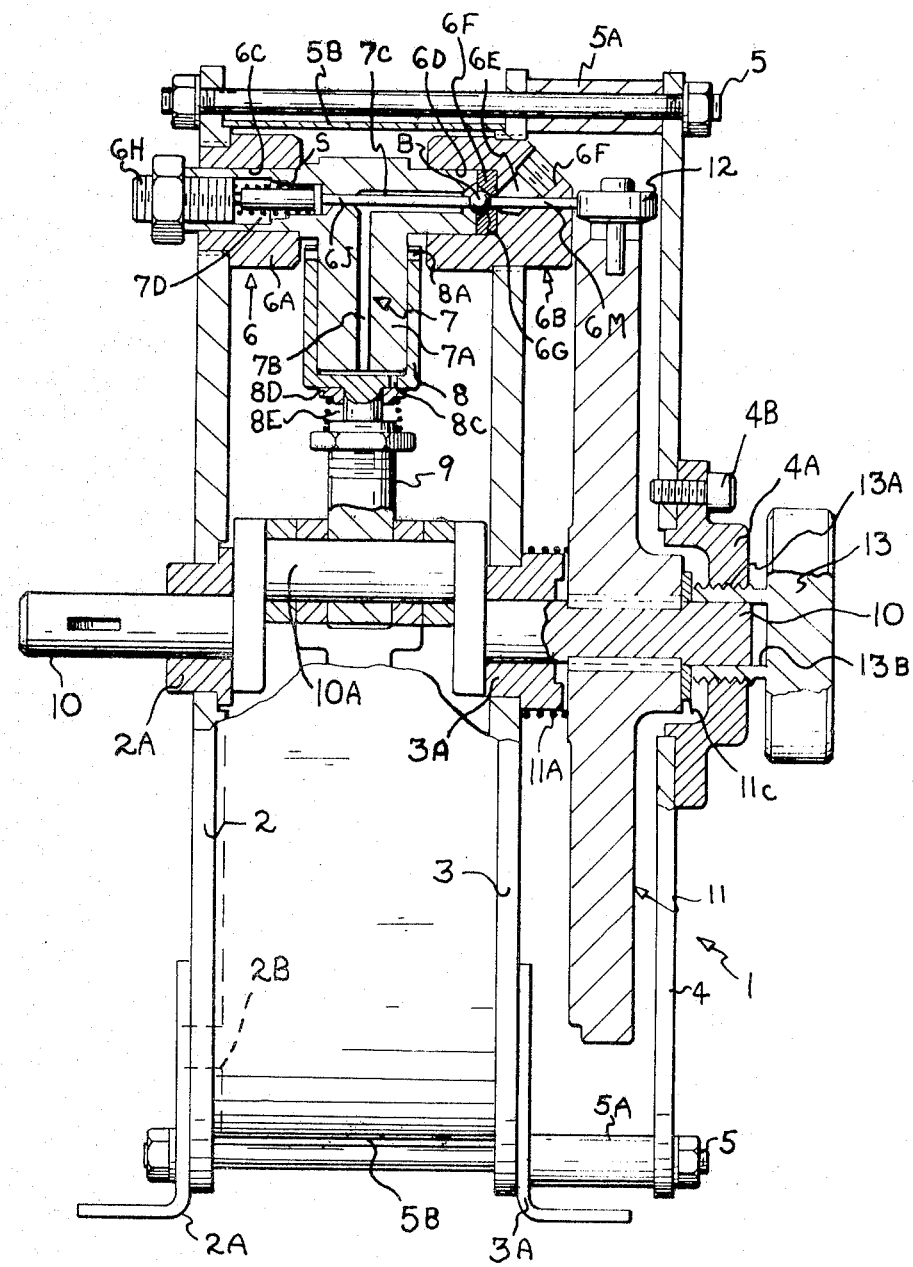
FIG. 1 is a vertical sectional view of a fluid pressure engine embodying this invention.
Figure 2:
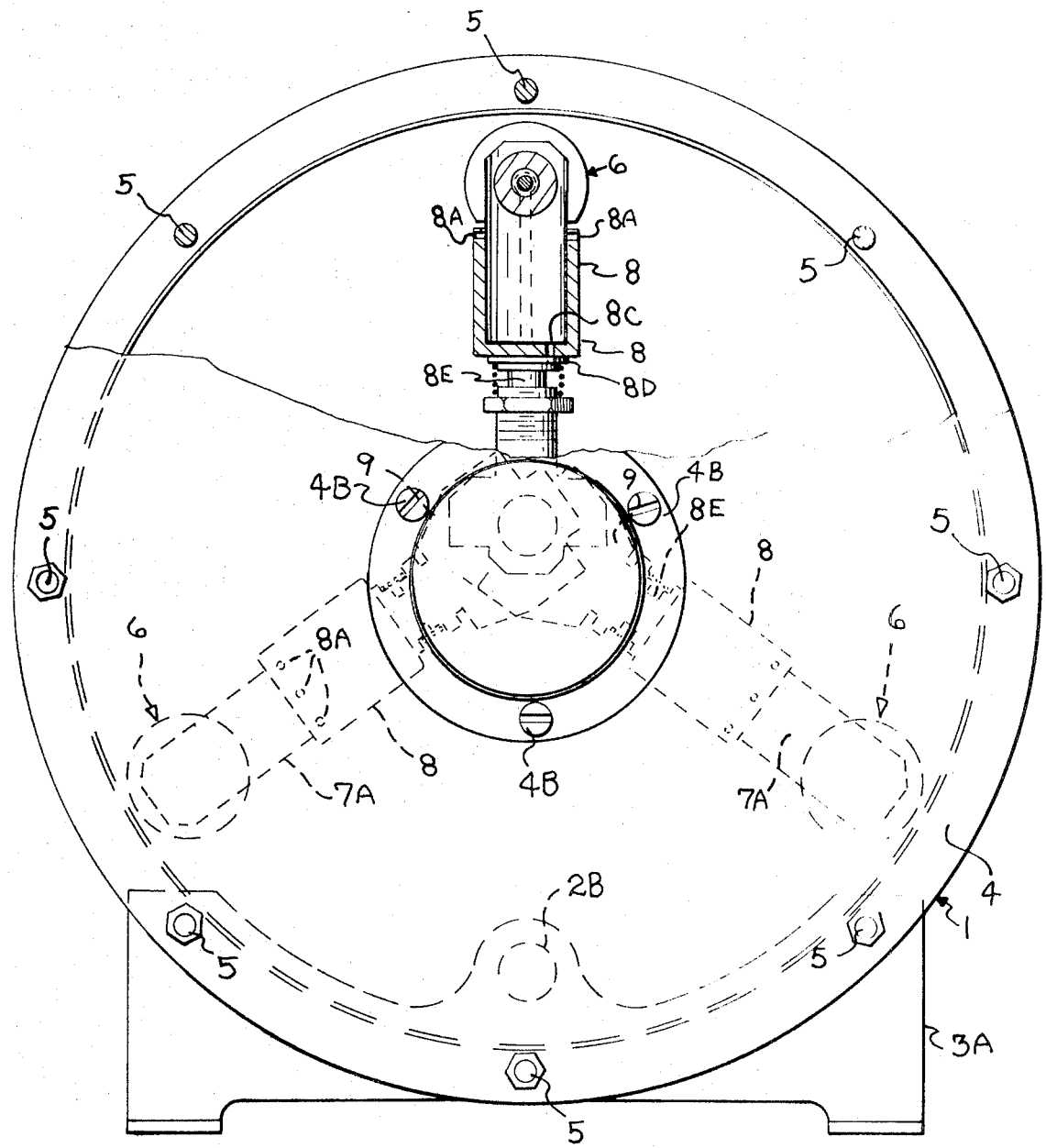
FIG. 2 is a side view, partly in section, of FIG. 1.

While the fluid pressure engine 1 shown in drawings is illustrated as being the type having a horizontal output shaft 10, those skilled in the art will recognize that this is merely a preferred embodiment and there is nothing in the construction that would prevent the output shaft from being disposed in a vertical position, depending solely upon the location of the mounting brackets for the engine.

The engine 1 comprises a housing which is defined by three circular plates 2, 3 and 4 respectively. These plates are secured in axially spaced relationship by a plurality of bolts 5 disposed around the perimeters of such plates and cooperating with individual sleeve spacers 5A to space apart plates 3 and 4 and a large annular spacer 5B to space apart plates 2 and 3. The space defined between circular plates 2 and 3 houses the piston, cylinder, crankshaft and valving components of the fluid pressure engine, while the space between plates 3 and 4 houses the flywheel and the valve actuating mechanism. A pair of L-shaped mounting brackets 2A and 3A are secured to the lower portions of housings 2 and 3 respectively by bolts 5.

Plates 2 and 3 are respectively provided with central bearings 2A and 3A to accommodate the opposite ends of the power shaft 10. These portions of power shaft 10 intermediate the bearings 2A and 3A are formed into a crank portion 10A.

Those skilled in the art will recognize that any fluid pressure engine can be of single cylinder or multi-cylinder construction, depending upon the whims of the designer. In the specific example to be herein described, the engine is illustrated as having three cylinders. Accordingly, at 120° spaced points in the chamber defined by the plates 2 and 3 three identical trunnion assemblies 6 are provided. Each trunnion assembly comprises a left-hand bushing 6A which is threaded into engagement with the plate 2 and a right-hand bushing 6B which is threadably mounted in the plate 3. These bushings define aligned bearing bores 6C and 6D respectively which receive and pivotally journal the opposite ends of a T-shaped piston member 7. Each piston element 7 has a radial cylindrical projection 7A which forms one of the elements of a fluid expansion chamber, here illustrated as being the piston element. A cup-shaped cylinder member 8 cooperates with the piston portion 7A in conventional fashion and is suitably secured to the end of a connecting rod 9, which in turn is journalled on the crank portion 10A on the power shaft 10.

Those skilled in the art will recognize that it is a matter of design choice as to whether the elements 7A and 8 are reversed; thus the projection 7A could have comprised a hollow cylindrical sleeve which cooperated with a solid piston member 8 but in either event, these two elements define a fluid expansion chamber which will be effective to drive the power shaft 10 upon the admission of pressured fluid to the space defined between the cooperating piston and cylinder elements.

The piston portion 7A has an axial passage 7B to permit pressured fluid to enter the fluid expansion chamber. Axial passage 7B in turn communicates with axial passage 7C extending toward the bushing 6B and communicating with a chamber 6E in such bushing, to which pressured fluid, such as steam, is admitted from a suitable source (not shown) by a pipe (not shown) threaded into the threads 6B shown at the end of the chamber 6E. At the base of the bushing bore 6D an annular valve seat 6F is inserted. Such valve seat is preferably formed of a hardened material that will be resistant to the high velocity fluid passing its surfaces. The actual valving surface is an annular conical surface 6G. A ball B is provided to cooperate with the valve surface 6G. Ball B is normally held in sealing or closing relationship with respect to the valving surface 6G by the action of a spring-pressed rod 6J which extends through axial passage 7C and into an enlarged spring chamber 7D formed in the bearing end of piston element 7 that is journalled in the bore 6C of bushing 6A. A spring S is inserted in the spring chamber, and the compressive force exerted by said spring on the ball B is adjusted by a screw 6H.

In accordance with this invention, the ball B of the fluid inlet valve is momentarily actuated to an open position by an impact force. A striker or actuating rod 6M is slidably mounted in a suitable axial hole provided in the right-hand end of bushing 6B. One end of this rod is normally in contact with the ball B and the other end of the rod projects into the chamber defined between the housing plates 3 and 4.

A combination fly wheel and timing disc 11 is keyed to the end of shaft 10 which projects through the space defined between housing plates 3 and 4. On the periphery of disc 11 an actuating roller 12 is journalled for rotation about an axis that is radial with respect to the axis of the power shaft 10. Thus, as disc 11 rotates, the actuating roller 12 contacts and imparts an impact blow to the ball valve actuating rod 6M and therefore momentarily displaces the ball B from its cooperating valve seat 6G and permits pressured fluid to flow into the fluid expansion chamber defined by the cooperating piston and cylinder elements 7A and 8.

To conveniently adjust the length of time in each rotation of the power shaft 10 that the inlet ball valve is open, the valve disc 11 is mounted for axial adjustment relative to the power shaft 10 and hence relative to the actuator rod 6M. Disc 11 is normally biased toward plate 4 by a compression spring 11A mounted between the bottom of the disc and the adjacent face of plate 3, surrounding bearing 3A. An internally threaded bushing 4A is mounted on plate 4 by a plurality of mounting screws 4B. An adjusting knob 13 is provided having a threaded steam portion 13A which cooperates with the internal threads of bushing 4A. Additionally, the stem portion has an axial bore 13B to slidably receive therein the extreme right-hand end of the power shaft 10. The fly wheel disc 11 normally abuts the end of the stem portion 13A through an intermediate thrust bearing or washer 11C.

Thus, as the control knob 13 is rotated in such a direction as to move the stem 13A inwardly relative to the housing plate 4, the valve disc 11 will be moved axially toward the plate 3 and thus the roller 12 will be in contact with the ball valve actuator rod 6M for an increased period of time and will displace ball B further from its valve seat 6G, even though this increase is but a small portion of the total rotation of the valve disc 11.

The above-described valving arrangement has an inherent speed governing feature. When the engine is first started and the power shaft 10 is slowly moved through the position where one of the ball valves B is opened, the length of time that such valve will be open is quite substantial, permitting a large amount of pressured fluid to flow into the fluid expansion chamber and initiate the start up of the engine. As the engine gains in speed, the length of time that the ball valve is open during each revolution is automatically decreased as a direct function of the speed of the power shaft 10 and hence there is no danger that the engine can achieve a runaway speed condition, resulting in damage to either the engine or the operator.

The exhaust of fluid from the fluid expansion chamber takes place automatically. As best shown in FIG. 1, as the cylinder 8 moves radially inwardly with respect to the piston 7A, openings 8A in the side wall of such piston are brought into communication with the end of piston 7A and the remaining fluid is promptly exhausted from the fluid expansion chamber defined between piston 7A and cylinder 8. For relatively low power applications, such as for lawn mowers and garden tractors, where efficiency of the engine operation is not a vital factor, it is contemplated that the chamber defined between housing plates 2 and 3 would be open to atmosphere, as by port 2B in plate 2, and hence the spent fluid would be exhausted to the atmosphere. If higher efficiency is desired, it would of course be necessary to recover the spent fluid and utilize the residual energy therein as a preheating means or something similar.

Still another feature of this invention lies in the means provided for assuring the start-up of the engine when the fluid pressure chamber may be filled with water. At the base of the cup-shaped cylinder 8 a fluid drain port 8C is provided, and this port is normally closed by a spring-pressed annular valve member 8D which surrounds the cylindrical portion 8E of cylinder 8 which connects to piston rod 9. Thus, as the engine is initially rotated, the excessive pressure developed by the existence of water in the cylinder is sufficient to overcome the spring pressure on the valve 8D and permit the same to open and the fluid to be expelled from the fluid expansion chamber.

From the foregoing description, it is apparent that this invention provides a simple yet uniquely desirable valving system for fluid pressure engines, and particularly steam engines. The utilization of a ball valve as the input valve insures that no corrosion of the valving surfaces will occur due to the erosive action of the steam flowing by such surfaces at high velocities. The speed control achieved by the valving arrangements is not only consistent but it is convenient and foolproof.

As will be evident to those skilled in the art, modifications of this invention can be made in the light of the foregoing disclosure without departing from the scope of the appended claims.

I claim:

1. In a fluid pressure engine having a crankshaft and a plurality of fluid expansion cylinders operatively connected to said crankshaft and radially disposed relative thereto, the improvement comprising:
    (1) means respectively defining pressured fluid inlet passages to said cylinders;
    (2) an annular valve seat surrounding each said fluid inlet passage;
    (3) a spring pressed valve cooperating with each valve seat to normally close the respective fluid inlet passage;
    (4) a shiftable actuator for displacing each valve from its respective valve seat and having one end abutting the valve, said actuators being symmetrically disposed around the axis of said crankshaft; and
    (5) a timing disc co-rotatable with said crankshaft and having a roller element thereon momentarily engageable with the other end of each said actuator during each rotation of the timing disc to momentarily shift each said valve to open position in timed sequence by an impact blow from the respective actuator.

2. The combination defined in claim 1, plus means for adjusting the axial position of said timing disc relative to said actuators, thereby controlling the amount of pressured fluid admitted to the fluid expansion cylinders.

3. The combination defined in claim 1, wherein said actuators each comprise a plunger mounted for shiftable movement parallel to the axis of said crankshaft and said valves each comprise a ball, one end of said plunger engaging the respective valve ball and the other end disposed in the path of rotation of said impact element, and said timing disc comprises a disc keyed to, but axially shiftable relative to, said crankshaft, plus means for adjusting the axial position of said disc relative to said crankshaft, thereby varying the opening period of each ball valve.

4. In a fluid pressure engine having a housing, a crankshaft journalled in said housing, and at least one fluid expansion cylinder radially disposed in said housing and operatively connected to said crankshaft, the improvement comprising:
  (1) means defining a pressured fluid inlet passage to said cylinder, the inlet end of said passage being parallel to the crankshaft axis;
  (2) an annular conical valve seat surrounding said inlet end of said inlet passage;
  (3) a spring pressed ball cooperating with said seat to normally close said fluid inlet passage;
  (4) a timing disc mounted on said crankshaft and co-rotatable therewith;
  (5) an actuating roller mounted on the periphery of said timing disc for rotation about an axis radial to the axis of said crankshaft;
  (6) a ball actuating plunger; and
  (7) means mounting said plunger for reciprocal movement parallel to the axis of said crankshaft, with one end of said plunger engaging the inlet side of said ball and the other end disposed in the path of rotation of said actuating roller for impact thereby.

5. The combination defined in claim 4, plus means for axially adjusting the position of said timing disc, thereby adjusting the opening period of said ball valve.

6. A rotary fluid pressure engine comprising, in combination:
  (1) a housing formed by two circular plates secured in axially spaced relationship;
  (2) axially aligned bearings in said plates;
  (3) a crankshaft journalled in said bearings and having shaft portions projecting through each bearing;
  (4) a plurality of swivels mounted between the peripheries of said plates and journalled for pivotal movement about axes respectively parallel to the crankshaft axis;
  (5) a radial projection on each swivel defining the fixed element of a two-element fluid expansion chamber;
  (6) a rod connecting the movable element of the fluid expansion chamber to said crankshaft, whereby the introduction of pressurized fluid to said chamber provides a driving force to said crankshaft;
  (7) an inlet passage for pressurized fluid in each swivel extending from one axial end of the swivel through said radial projection;
  (8) a spring pressed, normally closed ball check valve mounted in the inlet end of said fluid passage;
  (9) a valve opening plunger having one end in contact with the inlet face of said ball valve and the other end projecting through the adjacent place; and
  (10) a timing disc mounted on the projecting end of said crankshaft in overlying relationship to said adjacent plate, said disc having a roller mounted on its periphery engageable with said other end of said plunger by impact to momentarily depress said plunger, thereby permitting pressured fluid to enter said fluid expansion chamber.

7. The combination defined in claim 6, plus means for adjusting the axial position of said timing disc relative to said adjacent plate, thereby concurrently adjusting the opening period of all said ball check valves.

References Cited
UNITED STATES PATENTS

| | | | |
|---|---|---|---|
| 602,630 | 4/1898 | Smith | 91—188 |
| 1,502,244 | 7/1924 | Gore | 91—188 |
| 2,115,556 | 4/1938 | Maniscalco | 91—188 |
| 3,203,318 | 4/1965 | Sheesley | 91—188 |

PAUL E. MASLOUSKY, Primary Examiner

U.S. Cl. X.R.

91—176, 188